(12) United States Patent
Chopra et al.

(10) Patent No.: US 10,671,311 B1
(45) Date of Patent: Jun. 2, 2020

(54) SYSTEM AND METHOD FOR DYNAMIC DATA MIGRATION

(71) Applicant: EMC IP Holding Company LLC, Hopkinton, MA (US)

(72) Inventors: Shelesh Chopra, Bangalore (IN); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/866,562

(22) Filed: Jan. 10, 2018

(51) Int. Cl.
*G06F 12/00* (2006.01)
*G06F 3/06* (2006.01)
*H04L 29/08* (2006.01)

(52) U.S. Cl.
CPC ........ *G06F 3/0647* (2013.01); *H04L 67/1012* (2013.01); *H04L 67/1023* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 8,554,918 B1 | 10/2013 | Douglis | |
| 9,098,525 B1 | 8/2015 | Mandic et al. | |
| 9,330,109 B2 | 5/2016 | Bone | |
| 9,451,013 B1 | 9/2016 | Roth | |
| 9,531,809 B1 | 12/2016 | Brooker | |
| 9,740,435 B2 | 8/2017 | Dolce et al. | |
| 9,953,075 B1 | 4/2018 | Reiner | |
| 9,977,704 B1 | 5/2018 | Chopra et al. | |
| 10,089,148 B1 | 10/2018 | Blitzer | |
| 10,180,912 B1* | 1/2019 | Franklin | G06F 12/1408 |
| 2005/0033756 A1 | 2/2005 | Kottomtharayil | |
| 2006/0224852 A1 | 10/2006 | Kottomtharayil | |
| 2009/0260021 A1 | 10/2009 | Haenel | |
| 2011/0137870 A1 | 6/2011 | Feder et al. | |
| 2011/0314069 A1 | 12/2011 | Alatorre | |
| 2012/0059934 A1 | 3/2012 | Ratiq et al. | |
| 2012/0278569 A1 | 11/2012 | Kawakami et al. | |

(Continued)

FOREIGN PATENT DOCUMENTS

WO 01/06368 A1 1/2001

OTHER PUBLICATIONS

European Extended Search Report issued in corresponding EP application 19150826.6 (8 pages).

(Continued)

*Primary Examiner* — John A Lane
(74) *Attorney, Agent, or Firm* — Chamberlain, Hrdlicka, White, Williams & Aughtry

(57) ABSTRACT

A storage gateway for managing data includes a persistent storage and a processor. The persistent storage stores a stored data history map. The processor obtains a data storage request for a datum from a client; stores the datum in a first storage based on a quality of storage service requirement associated with the datum; after the datum is stored in the first storage, updates the stored data history map associated with the datum based on the quality of storage service characteristics of the first storage; and after updating the stored data history map, migrates the datum to a second storage based on the quality of storage service requirement and the updated stored data history map.

18 Claims, 15 Drawing Sheets

(56) References Cited

U.S. PATENT DOCUMENTS

| | | |
|---|---|---|
| 2012/0331248 A1 | 12/2012 | Kono et al. |
| 2013/0138649 A1 | 5/2013 | Broberg |
| 2013/0290627 A1 | 10/2013 | Nazari et al. |
| 2014/0082167 A1 | 3/2014 | Robinson |
| 2014/0281301 A1 | 9/2014 | Reinoso |
| 2014/0297950 A1 | 10/2014 | Kuwayama |
| 2014/0380014 A1 | 12/2014 | Moyer |
| 2015/0154418 A1 | 6/2015 | Redberg |
| 2015/0205528 A1 | 7/2015 | Hyde, II |
| 2015/0261468 A1 | 9/2015 | Khoyi et al. |
| 2016/0054922 A1* | 2/2016 | Awasthi ............ G06F 3/0631 711/103 |
| 2016/0062779 A1 | 3/2016 | Tsirkin |
| 2016/0062795 A1 | 3/2016 | Hu et al. |
| 2016/0085574 A1 | 3/2016 | Dornemann et al. |
| 2017/0060695 A1 | 3/2017 | Clare |
| 2017/0093976 A1 | 3/2017 | Raghunath et al. |
| 2017/0168729 A1 | 6/2017 | Faulkner et al. |
| 2017/0302555 A1 | 10/2017 | Weinman |
| 2017/0351426 A1 | 12/2017 | Anderson et al. |
| 2018/0188989 A1 | 7/2018 | Nachimuthu et al. |
| 2018/0267830 A1 | 9/2018 | Rivera et al. |
| 2018/0314429 A1 | 11/2018 | Thomas |
| 2019/0235922 A1 | 8/2019 | Iovanna et al. |
| 2019/0245794 A1 | 8/2019 | Kalman et al. |

OTHER PUBLICATIONS

European Extended Search Report issued in corresponding European Application No. 19169657.4, dated Nov. 27, 2019.

* cited by examiner

SYSTEM AND METHOD FOR DYNAMIC DATA MIGRATION

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, a storage gateway for managing data in accordance with one or more embodiments of the invention includes a persistent storage and a processor. The persistent storage stores a stored data history map. The processor obtains a data storage request for a datum from a client; stores the datum in a first storage based on a quality of storage service requirement associated with the datum; after the datum is stored in the first storage, updates the stored data history map associated with the datum based on the quality of storage service characteristics of the first storage; and after updating the stored data history map, migrates the datum to a second storage based on the quality of storage service requirement and the updated stored data history map.

In one aspect, a method of operating a storage gateway for managing data in accordance with one or more embodiments of the invention includes obtaining a data storage request for a datum from a client. The method includes storing the datum in a first storage based on a quality of storage service requirement associated with the data. The method includes, after storing the datum, updating a stored data history map associated with the datum based on the quality of storage service characteristics of the first storage. The method includes, after updating the stored data history map, migrating the datum to a second storage based on the quality of storage service requirement and the updated stored data history map.

In one aspect, a non-transitory computer readable medium in accordance with one or more embodiments of the invention includes computer readable program code, which when executed by a computer processor enables the computer processor to perform a method for operating a storage gateway for managing data. The method includes obtaining a data storage request for a datum from a client. The method includes storing the datum in a first storage based on a quality of storage service requirement associated with the data. The method includes, after storing the datum, updating a stored data history map associated with the datum based on the quality of storage service characteristics of the first storage. The method includes, after updating the stored data history map, migrating the datum to a second storage based on the quality of storage service requirement and the updated stored data history map.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
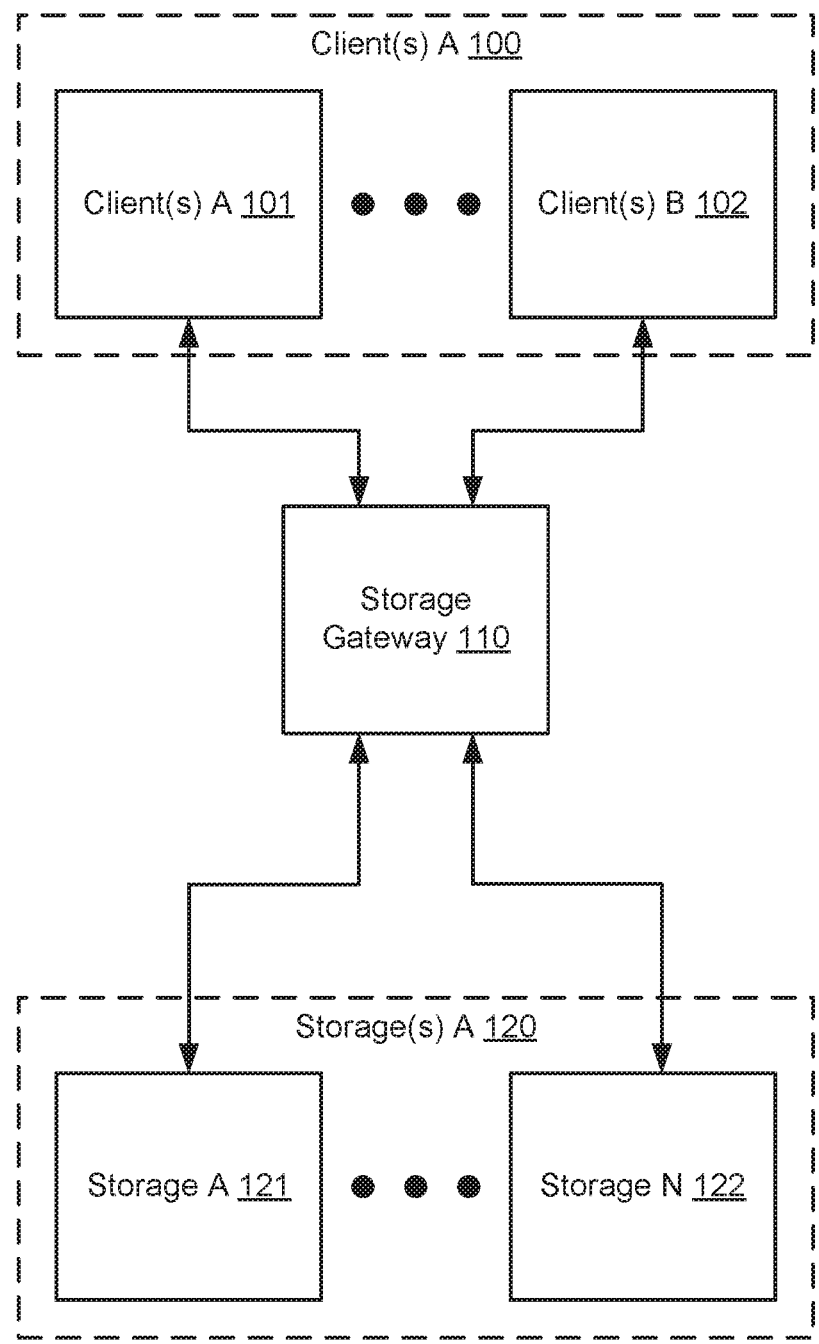
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. More specifically, the systems, devices, and methods may store data from clients in storages. The storages may be remote from the clients to reduce the likelihood that a natural disaster or other event would wipe out all copies of the stored data.

In one or more embodiments of the invention, the data may be migrated to different storages over the storage lifetime of the data. For example, during a first period of time client data may be stored in a first storage, at the start of a second period of time the client data may be migrated to a second storage where it is stored for the duration of the second period of time, at the start of a third period of time the client data may be migrated to a third storage where it is stored for the duration of the third period of time, etc. Each period of time may be of any duration.

In one or more embodiments of the invention, the storage in which the data is stored during any period of time may be based, at least in part, on a data storage map. The data storage map may be a data structure that indicates the storage history location of the data over time. For example, the data history map may indicate that the data was stored in a first storage during a first period of time, the data was stored in a second storage during a second period of time, etc.

In one or more embodiments of the invention, the data history map may also specify the quality of storage service provided of the storage in which the data was stored during each period of time. As used herein, the quality of storage service are characteristics of the storage that impact the storage of the data. For example, the characteristics may include the amount of time that stored data is provided to clients by the storage in response to a data access request, the bandwidth or latency of the network connection between the storage and the clients, the computing resources of the storage utilized to provide the data, the computing resources of the storage utilized to store the data, the deduplication rate of the stored data, the cache hit rate of the data, etc. The characteristics may include additional, fewer, and/or different characteristics without departing from the invention.

As used herein, computing resources refer to processor computing cycles, communication bandwidth, transitory storage input-output cycles, persistent storage input-output cycles, and/or transitory or persistent memory storage capacity. Transitory storage may be provided by, for example, random access memory. Persistent storage memory may be provided by, for example, a solid state hard disk drive. Processor computing cycles may be provided by, for example, a central processing unit. Communication bandwidth may be provided by, for example, a network interface card.

In one or more embodiments of the invention, copies of client data may be replicated to multiple storages. Replicating the data may further reduce the likelihood that a natural disaster would wipe out all copies of the stored data. In some embodiments of the invention, the data history map may specify the location and/or quality of storage service of each copy of the client data stored in the storages over time. In other embodiments of the invention, the data history map may specify only the location and/or quality of storage service of the copy of the client data stored in the storages that received the highest quality of storage service in each period of time. In still further embodiments of the invention, the data history map may specify only the location and/or quality of storage service of the copy of the client data stored in the storages that received the lowest quality of storage service in each period of time.

FIG. 1A shows an example system in accordance with one or more embodiments of the invention. The system includes client(s) (100) that store data in storages (120) via a storage gateway (110). The storage gateway (110) manages storing of the client data in the storages (120) by selecting a storage for the client data and/or initiating migration and/or replication of stored client data. The client data may be migrated and/or replicated to meet quality of storage service requirements for the stored data. The location, i.e., the storage, of migration or replication of the client data may be selected based on a stored data history map associated with the client data. The clients (100), storage gateway (110), and storages (120) may be operably connected to each other. The aforementioned components of the system may be connected by, for example, a network, a direct connection, or any other type of connection mechanism. Each component of the system is discussed below.

The clients (100) may be programmed to store data in the storages (120) via the storage gateway (110). By storing data in the storages (120), the clients (100) may store backup copies of data and/or reduce the storage utilization rate of the clients, e.g., utilize the storages (120) as a remote storage.

In one or more embodiments of the invention, the clients (100) store a copy of all or a portion of the respective client's data in the storages (120) via the storage gateway (110). In other words, the storage gateway (110) may be used to back up the client's data.

In one or more embodiments of the invention, the clients (100) store data in the storages (120) via the storage gateway (110). In other words, rather than storing data to a local storage, the clients (100) may store data in the storages (120) via the storage gateway (110) without making a local copy of the stored data.

While the clients (102, 104) are illustrated as being assigned to a single storage gateway (110), multiple groupings of clients may be assigned to any number of storage gateways without departing from the invention. Additionally, while the storage gateway (110) is illustrated as being operably connected/use all storages (120), the storage gateway (110) may only be operably connected/use a portion of the storages (120) without departing from the invention. For example, a system may include two groupings of clients, each grouping may be serviced by separate storage gateways, and each storage gateway may utilize different storages to store data. Further, in some embodiments of the invention, different storage gateways may utilizes different groupings of storages that share one or more storages between the storage groupings.

To facilitate managing data from the clients, the storage gateway (110) may store the client data in the storages (120). The storages (120) may be computing devices. The computing devices may be, for example, mobile phones, tablet computers, laptop computers, desktop computers, servers, distributed computing systems, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The storages (120) may be other types of computing devices without departing from the invention.

In one or more embodiments of the invention, the storages (120) may be distributed computing devices. As used herein, a distributed computing device refers to functionality provided by a logical device that utilizes the computing resources of one or more separate and/or distinct computing devices. For example, in one or more embodiments of the invention, the storages (120) may be distributed devices that include components distributed across a number of separate and/or distinct computing devices. In such a scenario, the functionality of the storages (120) may be performed by multiple different computing devices without departing from the invention.

The storages (120) may store client data or provide previously stored client data. The storages (120) may store or provide client data in response to requests from the storage gateways (110). In response to the requests, the storages (120) may take appropriate action to service the aforementioned storage/access requests from the storage gateways. The storages (120) may also store copies of previously stored client data for data security purposes. For example, copies of client data stored in a first storage may be replicated in a second storage. Additionally, different storages may have different performance characteristics and/or connection characteristics that impact the quality of storage services provided by the storages. For example, different storages may be connected to clients using different connections that have different bandwidth limitations. In another example, different storages may store different types of data and provide different degrees of deduplication of client data. Thus, different storages may provide different qualities of storage service for stored client data depending on many different factors. For additional details regarding the storages (120), See FIG. 1C.

While the storages (121, 122) are illustrated as being operably connected to a single storage gateway (110), the storages storage may be operably connected to any number and/or combination of storage gateways without departing from the invention. In other words, each storage of the storages (120) may provide storage services for any number of storage gateways. For example, a system contemplated herein may include multiple storage gateways that each provides storage services to groups of clients. The groups may be different groups of clients (e.g., groups unique members in each group) or partially different groups of clients (e.g., different groups of clients that have some clients as members of both groups).

As discussed above, the clients (100) may store/access data in the storages (120) via the storage gateway (110). In one or more embodiments of the invention, the storage gateway (110): (i) selects a location for storage of client data, (ii) migrates and/or replicates stored client data using a stored data history map, and (iii) provides stored client data in response to client access requests. In one or more embodiments of the invention, the storage gateway (110) generates and/or updates the data storage history map of client data when performing (i) and/or (ii). In some embodiments of the invention, the storage gateway (110) stores a data storage history map associated with the data that the storage gateway (110) manages. However, it is contemplated that in some embodiments of the invention, the data storage history map is stored separately from the storage gateway (110). The stored data history map may be stored on another component of the system illustrated in FIG. 1A without departing from the invention.

In one or more embodiments of the invention, the storage gateway (110) is a computing device. The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and the methods illustrated in FIGS. 4A-4C. The storage gateway (110) may be other types of computing devices without departing from the invention.

In one or more embodiments of the invention, the storage gateway (110) is a distributed computing device. As used herein, a distributed computing device refers to functionality provided by a logical device that utilizes the computing resources of one or more separate and/or distinct computing devices. For example, in one or more embodiments of the invention, the storage gateway (110) may be a distributed device that includes components distributed across a number of separate and/or distinct computing devices. In such a scenario, the functionality of the storage gateway (110) may be performed by multiple different computing devices without departing from the invention.

In addition to the above noted functionality of the storage gateway (110), the storage gateway (110) may also act as a system controller to orchestrate operations of the system illustrated in FIG. 1A. For example, the storage gateway (110) may issue data storage/deletion/access commands to the storages. In another example, the storage gateway (110) may issue migration and/or replication commands to the storages. Thus, the storage gateway (110) may act as a single point of contact for the clients (100) and orchestrate the operation of the system illustrated in FIG. 1A to provide data management services to the clients (100). For additional details regarding the storage gateway (110), See FIG. 1B.

Figure 1B:
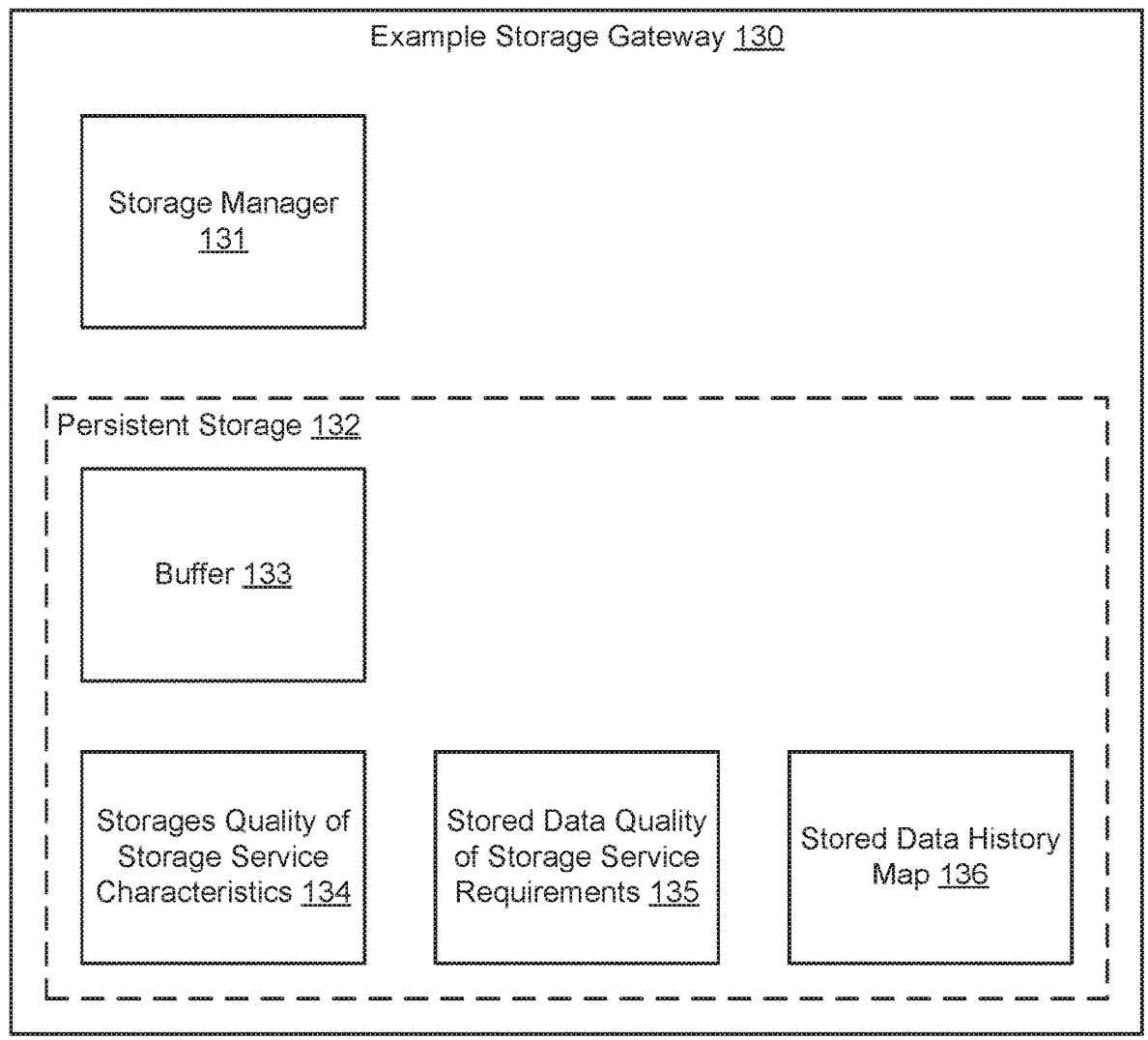
FIG. 1B shows a diagram of a storage gateway in accordance with one or more embodiments of the invention.
Figure 1C:
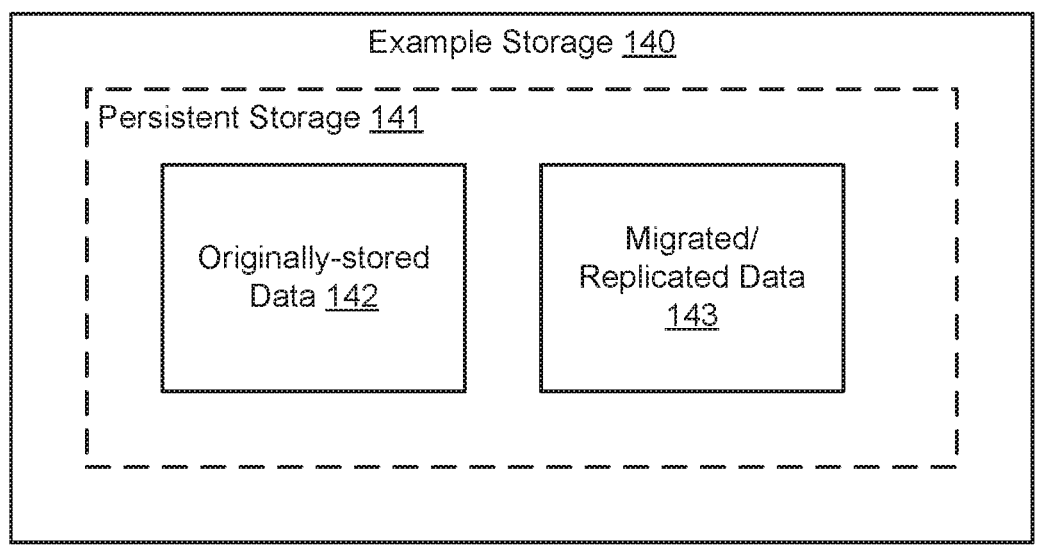
FIG. 1C shows a diagram of a storage in accordance with one or more embodiments of the invention.

To further explain embodiments of the invention, an example storage gateway (130) and an example storage (140) are illustrated in FIGS. 1B and 1C, respectively.

FIG. 1B shows an example storage gateway (130) in accordance with one or more embodiments of the invention. To provide the functionality of the storage gateway described with respect to FIG. 1A, the example storage gateway (130) may include a storage manager (131) and a persistent storage (132). The storage manager (131) may manage data from the clients. The persistent storage (132) may include a buffer (133) and store data structures used by the storage manager (131) to manage client data. The buffer (133) may be used to temporarily store client data in the storage gateway before storing the client data in the storages. Each component of the example storage gateway (130) is discussed below.

In one or more embodiments of the invention, to manage client data the storage manager (131): (i) stores/obtains data in/from the storages to service data storage/access requests from the clients and (ii) migrates/replicates data in the storages using a stored data history map (136) to meet quality of storage service requirements for the stored client data. To provide portions of the aforementioned functionality, the storage manager (131) may perform the methods illustrated in FIGS. 4A-4C. The storage manager (131) may manage client data using additional, fewer, or different methods without departing from the invention.

In one or more embodiments of the invention, the buffer (133) may store copies of a portion of the client data stored in the storages. The storage manager (131) may preferentially retrieve copies of client data stored in the buffer (133)

when servicing client request rather than retrieving copies of the client data stored in the storages.

In one or more embodiments of the invention, the storage manager (131) may be implemented as a circuit. For example, storage manager (131) may be implemented as a field programmable gate array, application integrated circuit, digital signal processor, or analog circuit. The storage manager (131) may be implemented as other types of circuit without departing from the invention.

In one or more embodiments of the invention, the storage manager (131) may be implemented as computer readable instructions stored on a non-transitory computer readable storage medium being executed by a processor. The computer readable instructions may cause the processor to perform the aforementioned functions of the storage manager (131).

In one or more embodiments of the invention, the persistent storage (132) is a physical device. The physical device may be, for example, a solid state hard drive, a disk drive, a tape drive, or other non-transitory storage medium. In some embodiments of the invention, the persistent storage (132) is a logical device that utilizes the physical computing resources of one or more other devices to provide data storage functionality. For example, the persistent storage (132) may be a logical storage that utilizes the physical storage capacity of disk drives of multiple, separate computing devices.

The persistent storage (132) may store a buffer (133) and data structures used by the storage manager (131). The data structures may include storage quality of storage service characteristics (134), stored data quality of storage service requirements (135), and/or a stored data history map (136). The persistent storage (132) may store additional, different, or less data without departing from the invention. The example storage gateway (130) may utilize the aforementioned data structures when performing the methods illustrated in FIGS. 4A-4C.

In one or more embodiments of the invention, the buffer (133) is a data structure stored in the persistent storage (132). The data structure may include copies of client data stored in the storages. In some cases, client data may be first stored in the buffer (133) and copies of the client data may be subsequently stored in the storages. Portions of the client data in the buffer (133) may be deleted and thereby result in a copy of only a portion of a client's data stored in the storages being maintained in the buffer (133).

In one or more embodiments of the invention, the storages quality of storage service characteristics (134) is a data structure that includes information regarding a quality of storage service provided by the storages on a per storage level. The quality of storage service may include one or more characteristics of the storage service provided by the storages. The characteristics of the storage service may be specified historically on a granular level. The data structure may include information used by the storage manager (131) to manage client data. For additional details regarding the storage quality of storage service characteristics (134), See FIG. 2A.

In one or more embodiments of the invention, the stored data quality of storage service requirements (135) is a data structure that includes information regarding a quality of storage service required for client data. The quality of storage service required by the client may specify the quality of storage service over the storage life of the client data. In other words, the quality of storage service of the storage hosting the client data over time. The stored data quality of storage service requirements (135) may be specified by the client that requested storage of the client data. The stored data quality of storage service requirements (135) may include information used by the storage manager (131) to manage client data. For additional details regarding the stored data quality of storage service requirements (135), See FIG. 2B.

In one or more embodiments of the invention, the stored data history map (136) is a data structure that includes information regarding where client data has been stored over the storage life of the client data. In other words, a historical account of the locations where the client data has been stored in the system. The stored data history map (136) may include information used by the storage manager (131) to manage client data. Additionally, the stored data history map (136) may be updated by the storage manager (131) whenever the storage manager causes client data to be stored/migrated/replicated. For additional details regarding the stored data history map (136), See FIG. 2C.

FIG. 1C shows an example storage (140) in accordance with one or more embodiments of the invention. The example storage (140) may store data, i.e., originally-stored data (142) from storage gateways or provide stored data to storage gateways in response to requests from the storage gateways. Additionally, copies of data from other storages, i.e., migrated replicated data (143), may be stored in the example storage (140).

In one or more embodiments of the invention, the example storage (140) includes a persistent storage (141). The persistent storage (141) may be a physical device. The physical device may be, for example, a solid state hard drive, a disk drive, a tape drive, or other non-transitory storage medium. In some embodiments of the invention, the persistent storage (141) may be a logical device that utilizes the physical computing resources of one or more other devices to provide data storage functionality. For example, the persistent storage (141) may be a logical storage that utilizes the physical storage capacity of disk drives of multiple, separate computing devices.

In one or more embodiments of the invention, the persistent storage (141) stores originally-stored data (142) and migrated/replicated data (143). The originally-stored data (142) may be data that is stored to the example storage (140) by a storage gateway in response to a client storage request. In other words, the originally-stored data (142) may be the first storage of the data to any storage. In contrast, the migrated/replicated data (143) may be data that is stored in the persistent storage (141) due to a migration or replication of data stored in another storage. In other words, the migrated/replicated data (143) may a second or tertiary storage of originally-stored data (142).

In one or more embodiments of the invention, the migrated/replicated data (143) is stored by a storage gateway or other entity to meet quality of storage service requirements. As discussed with respect to the example storage gateway (130, FIG. 1B) clients may specify quality of storage services for stored client data. The example storage gateway (130, FIG. 1B) may initiate migration or replication operations to meet the aforementioned quality of storage service requirements.

The originally-stored data (142) and migrated/replicated data (143) may include data of any format and/or combination of formats. For example, the aforementioned data may include text file, audio visual file, database files, and/or unstructured data. The data may include other types of data without departing from the invention.

In one or more embodiments of the invention, the originally-stored data (142) and/or migrated/replicated data (143)

may be deduplicated before storage in the persistent storage (141). In other words, the originally-stored data (142) and/or migrated/replicated data (143) may be deduplicated against other data stored in the persistent storage (141) before being stored in the persistent storage (141).

As used herein, deduplication refers to a process that attempts to reduce the required amount of storage space used to store data by not storing multiple copies of the same files or bit patterns. Deduplication balances the input-output (TO) limits of the physical devices used to store data against the benefit of reduced storage space requirements by only comparing the to-be-stored data to a portion of all of the data stored in the location where the to-be-stored data will be stored.

To deduplicate data, the to-be-stored data may be broken down into segments. The segments may correspond to portions of the to-be-stored data. Fingerprints that identify each segment of the to-be-stored data may be generated. The generated fingerprints may be compared to a portion of pre-existing fingerprints associated with a portion of the data already stored in the storage. Any segments of the to-be-stored data that do not match a fingerprint of the portion of the data already stored in the storage may be stored in the storage, the other segments are not stored in the storage. A file recipe to generate the now-stored data may be generated and stored so that the now-stored data may be retrieved from the storage. The recipe may include information that enables all of the segments of the to-be-stored data that were stored in the storage and all of the segments of the data already stored in the object storage having fingerprints that matched the fingerprints of the segments of the to-be-stored data to be retrieved from the object storage.

As used herein, a fingerprint may be a bit sequence that virtually uniquely identifies a segment. As used herein, virtually uniquely means that the probability of collision between each fingerprint of two segments that include different data is negligible, compared to the probability of other unavoidable causes of fatal errors. In one or more embodiments of the invention, the probability is $10^{\wedge}-20$ or less. In one or more embodiments of the invention, the unavoidable fatal error may be caused by a force of nature such as, for example, a tornado. In other words, the fingerprint of any two segments that specify different data will virtually always be different.

In one or more embodiments of the invention, a fingerprint of a bit sequence is generated by obtaining a hash of the bit sequence. The hash may be generated using, for example, secure hashing algorithm (SHA) 1. Other hashing algorithms may be used without departing from the invention.

The process of deduplication of data, discussed above, utilizes computing resources including processing cycles, storage IO, and/or network communications bandwidth. The particular type of deduplication implemented by the storage and the type of data stored in the deduplicated storage impact the quality of storage service provided by the example storage (140). One or more embodiments of the invention ensure that a quality of storage service requested by a client for client data is provided by: (i) comparing the historical locations where the client data has been stored and the quality of storage service provided by the aforementioned storage locations and (ii) automatically selecting a second storage for storing a copy of the data based on the comparison.

As discussed above, to manage client data the storage gateway may utilize storages to store the client data. The storages may be separate devices operably connected to the storage gateway and each storage may provide a different quality of storage service. Additionally, storages may be dynamically added or removed from the system. Thus, when data is initially stored in a storage the available storages may change before the data is migrated/replicated to a second storage. To further clarify this aspect, FIGS. 1D and 1E show an example scenario of a storage gateway and storage topology at a first and second point in time, respectively.

Figure 1D:
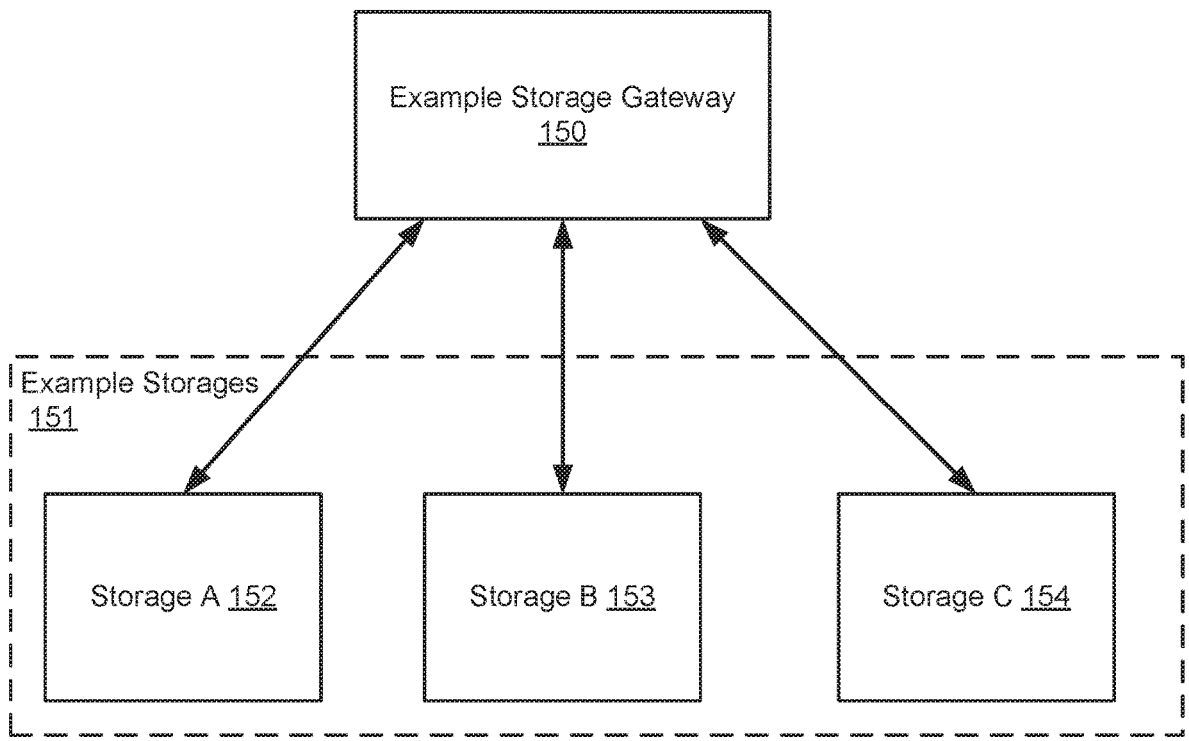
FIG. 1D shows a diagram of a first example storage gateway and storage topology in accordance with one or more embodiments of the invention.

FIG. 1D shows a diagram of an example storage topology at a first point in time. In the example topology at the first point in time, an example storage gateway (150) is operably connected to a set of example storages (151). The set of example storages includes three storages (152, 153, 154). At the first point in time, the example storage gateway (150) may store data in any of the three storages (152, 153, 154) and may migrate/replicate data to any of the three storages (152, 153, 154).

Figure 1E:
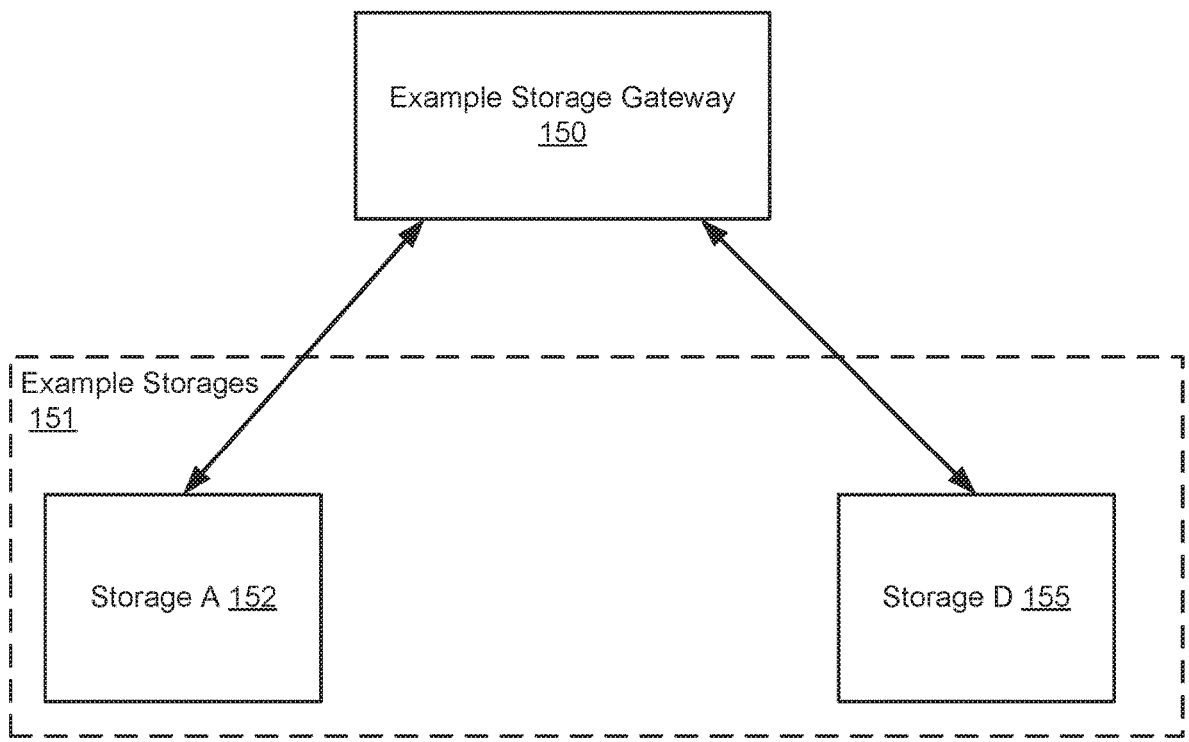
FIG. 1E shows a diagram of a second example storage gateway and storage topology in accordance with one or more embodiments of the invention.

FIG. 1E shows a diagram of the example storage topology of FIG. 1D at a second point in time. Between the first point in time and the second point in time, two storages (153, 154, FIG. 1E) were removed from the system and a storage D (155) was added to the system. Thus, at the second point in time, the example storage gateway (150) is operably connected to two storages (152, 155). Accordingly, data that was stored in storage A (152) at the first point in time can no longer be migrated/replicated to storage B (153, FIG. 1D) or storage C (154, FIG. 1D) at the second period of time. Rather, the stored data in storage A (152) may only be migrated/replicated to storage D (155) at the second point in time.

Figure 2A:
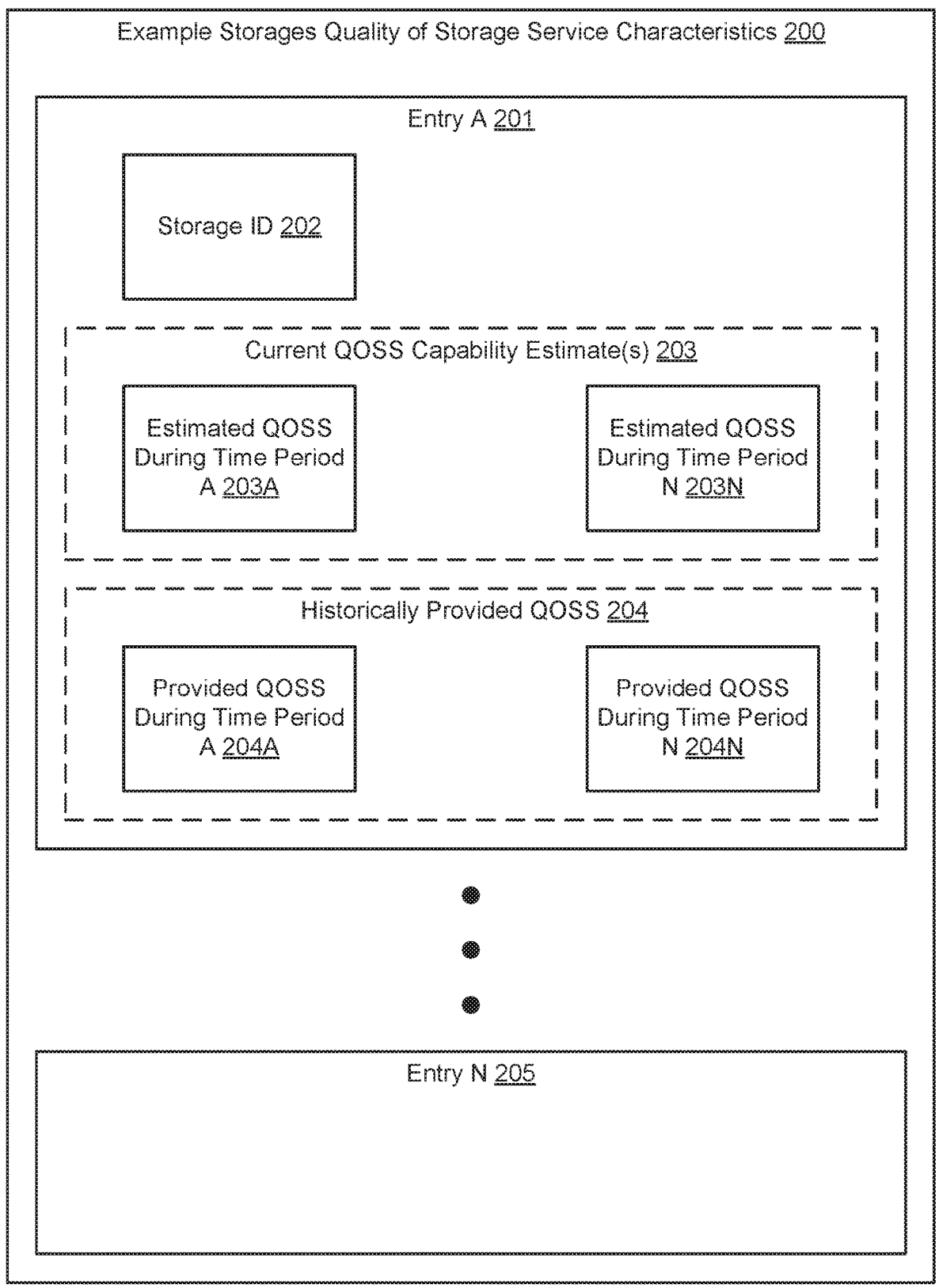
FIG. 2A shows a diagram of an example of second example of storages quality of storage service characteristics in accordance with one or more embodiments of the invention.
Figure 2B:
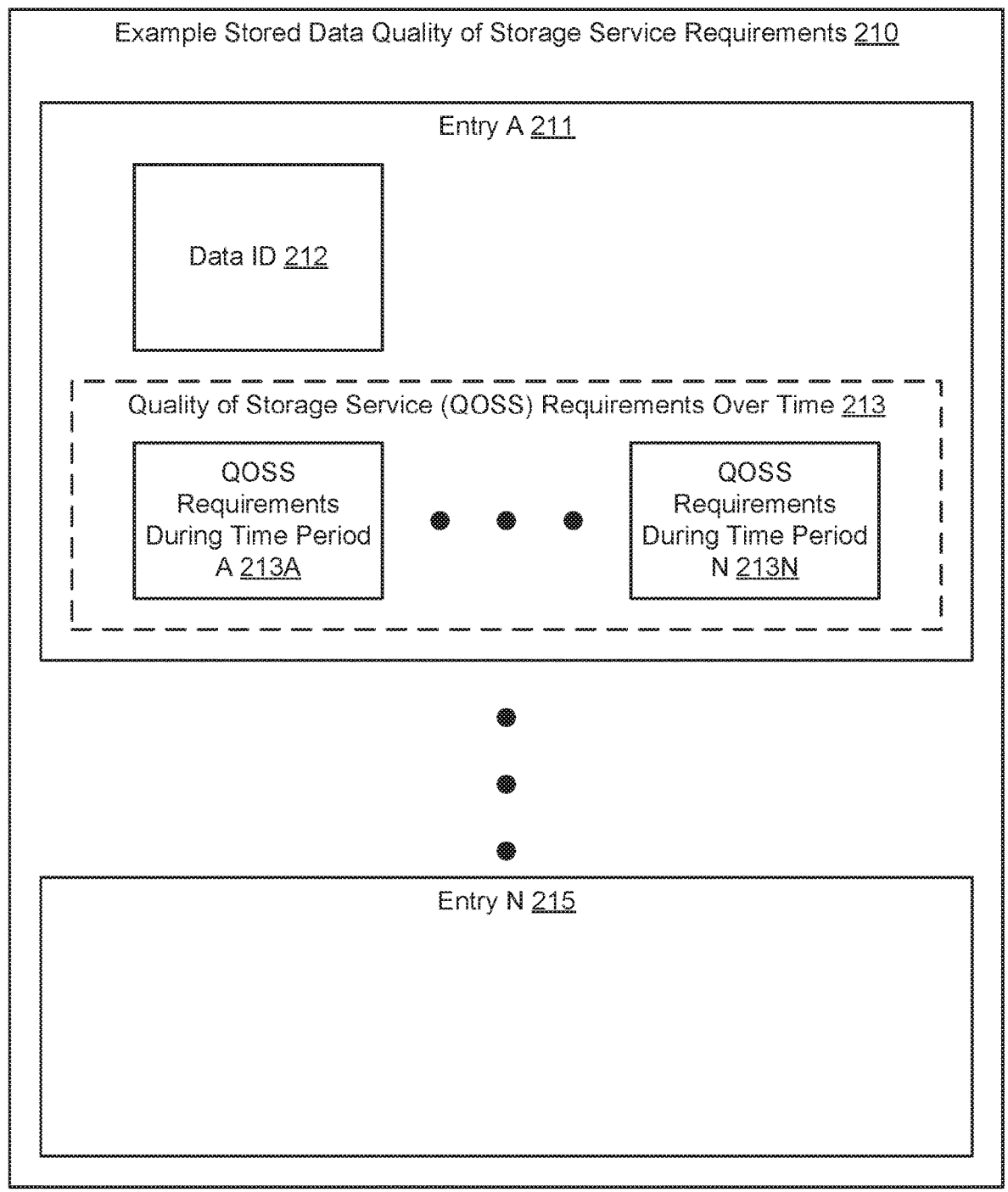
FIG. 2B shows a diagram of an example of stored data quality of storage service requirements in accordance with one or more embodiments of the invention.
Figure 2C:
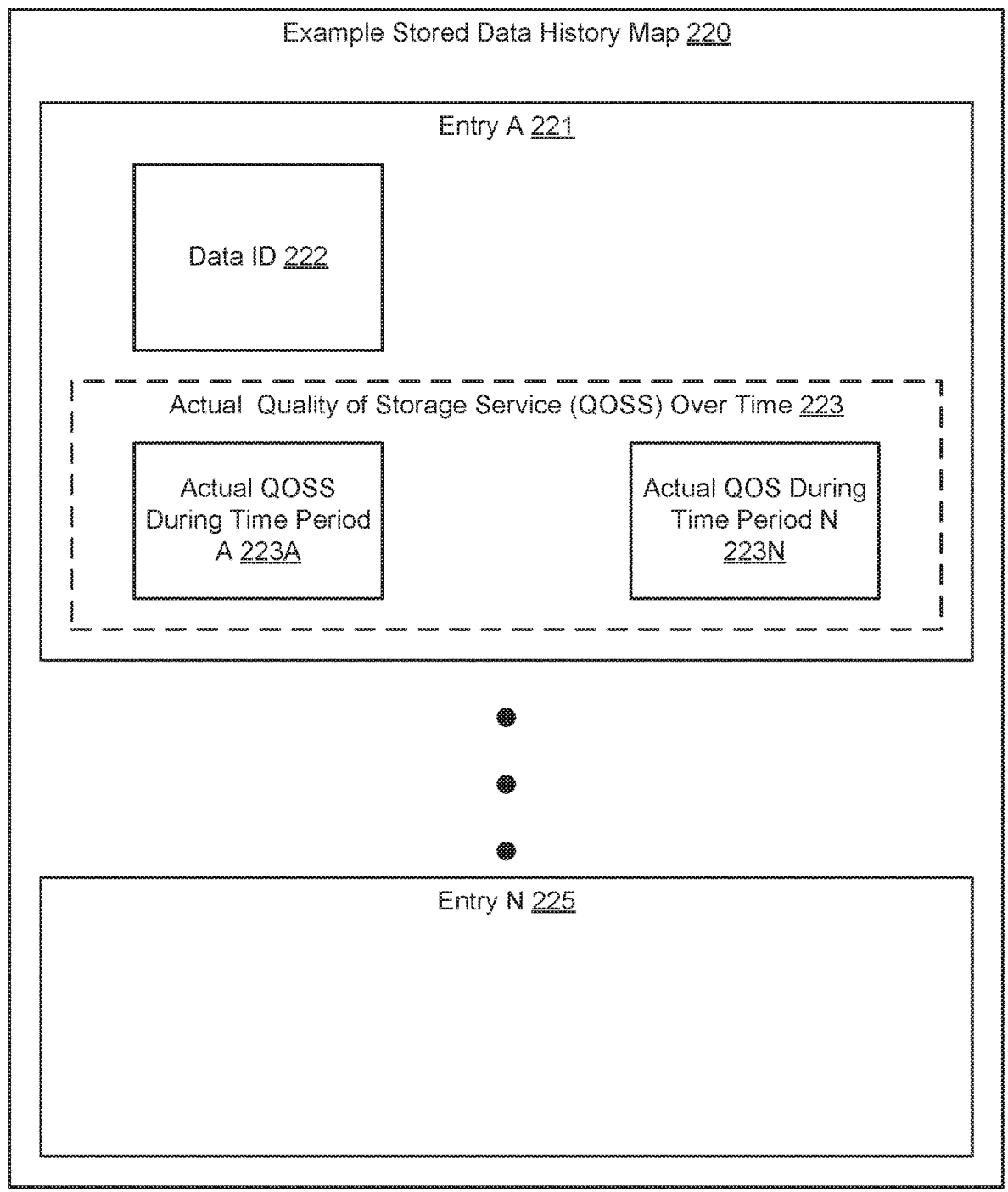
FIG. 2C shows a diagram of an example stored data history map in accordance with one or more embodiments of the invention.

The aforementioned scenario illustrated in FIGS. 1D and 1E adds complexity to migration/replication operations. Embodiments of the invention may provide a system that dynamically selects storages for migration/replication at the time data is migrated/replicated to meet quality of storage service requirements of the data. When making dynamic selects, the system may utilize data structures that specify characteristics of the storages, requirements for the stored data, and a map of the historic storage location of data within the system. FIGS. 2A-2C show examples of the aforementioned data structures used by the system illustrated in FIG. 1A.

FIG. 2A shows an example of storage quality of storage service characteristics (200) in accordance with one or more embodiments of the invention. The aforementioned characteristics may be utilized by the system of FIG. 1A when determining a location, i.e., a storage in which to store, migrate, and/or replicate data.

The example storage quality of storage service characteristics (200) may include entries (201, 205) associated with respective storages. Each entry (201, 205) may include a storage identifier (202) that identifies the storage to which the entry is associated.

Each entry (201, 205) may also include current quality of storage service (QOSS) capability estimates (203) for the associated storage. The current QOSS capability estimates (203) may specify characteristics of the storage service that the associated storage would be able to provide. For example, the current QOSS capability estimates (203) may specify one or more of: (i) a deduplication rate for client data, (ii) a computing resource cost of storing data in the associated storage, and (iii) a maximum amount of time that the associated storage will require to provide stored data. The current QOSS capability estimates (203) may specify additional, fewer, or difference characteristics of the quality of storage service that may be provided by the associated storage in the future without departing from the invention.

In one or more embodiments of the invention, the current QOSS capability estimates (203) maybe specified for different periods of time in the future. For example, each current QOSS capability estimates (203) may include a number of estimates QOSS during various future time periods (203A, 203N). The estimates for each time period may be based on one or more of the following factors: (i) the utilization rate of the storage, i.e., that ratio of used to unused storage space, (ii) the number of concurrent users of the storage, i.e., number of clients and/or storage gateways utilizing the storage, (iii) the rate of change of the number of users of the storage, (iv) the rate of change of the utilization rate of the storage, (v) characteristics of the data stored in the storage, i.e., diversity of file types being stored, and (vi) the rate of change of the deduplication rate of data being stored in the storage. The estimated QOSS during each future time period (203A, 203N) may be based on additional, fewer, or different factors without departing from the invention.

In one or more embodiments of the invention, the current QOSS capability estimates (203) are generated by the storages. In one or more embodiments of the invention, the current QOSS capability estimates (203) are generated by the storage gateway. The current QOSS capability estimates (203) may be generated by other entities without departing from the invention.

Each entry (201, 205) may further include historically provided QOSS (204). The historically provided QOSS (204) may specify characteristics of the storage service that were provided by the storage during different period of time in the past. For example, the historically provided QOSS (204) may specify one or more of: (i) a provided deduplication rate for client data, (ii) the computing resource cost of data that was stored in the associated storage, and (iii) the maximum amount of time that the associated storage took to provide stored data. The historically provided QOSS (204) may specify additional, fewer, or difference characteristics of the quality of storage service provided by the associated storage without departing from the invention.

In one or more embodiments of the invention, the historically provided QOSS (204) maybe specified for different periods of time in the past. For example, each historically provided QOSS (204) may include the provided QOSS during various time periods (204A, 204N) in the past.

In one or more embodiments of the invention, the historically provided QOSS (204) are generated by the storages. In one or more embodiments of the invention, the historically provided QOSS (204) are generated by the storage gateway. The historically provided QOSS (204) may be generated by other entities without departing from the invention.

FIG. 2B shows an example of stored data quality of storage service requirements (210) in accordance with one or more embodiments of the invention. The aforementioned requirements may be utilized by the system of FIG. 1A when determining a location, i.e., a storage in which to store, migrate, and/or replicate data.

The example stored data quality of storage service requirements (210 may include entries (211, 215) associated with respective client data. Each entry (201, 205) may include a storage (202) that identifies the data to which the entry is associated. The data identifier (212) may specify any quantity of data without departing from the invention.

Each entry (201, 205) may also include QOSS requirements over time (213) for the associated data. The QOSS requirements over time (213) may specify requirements for any storage that stores the associated data. For example, the QOSS requirements over time (213) may specify one or more of: (i) a minimum deduplication rate for the data, (ii) a maximum computing resource cost of storing the data, (iii) a maximum amount of time that the allowed to provide the data in response to data access requests, (iv) a maximum allowed cost for storing the data, (v) a target cost for storing the data, (vi) a minimum bandwidth/latency between a storage location of the data and a client, and (vii) a maximum summated cost of storing the data, i.e., the summed cost of storing the data in each storage in which it was stored up to a point in time. The QOSS requirements over time (213) may specify additional, fewer, or different requirements for the quality of storage service for the data without departing from the invention.

In one or more embodiments of the invention, the QOSS requirements over time (213) maybe specified for different periods of time in the future. For example, the QOSS requirements over time (213) for the associated data may include a number of QOSS requirements over different time periods (213A, 213N). In other words, the required quality of storage service for the data may change over time. For example, during a first year of the storage life of data, the QOSS requirement may specify a small amount of time for retrieving the data while in the second and later years of the storage life of the data the QOSS requirements may specify a large amount of time for retrieving the data.

In one or more embodiments of the invention, the QOSS requirements over time (213) are generated by the clients when the clients store the data. For example, a client may have a storage plan for the data at the time of storage of the data and may notify the storage gateway of the requirements at the time of storage.

FIG. 2C shows an example of a stored data history map (220) in accordance with one or more embodiments of the invention. The aforementioned map may be utilized by the system of FIG. 1A when determining a location, i.e., a storage in which to store, migrate, and/or replicate data.

The example stored data history map (220) may include entries (221, 225) associated with respective client data. Each entry (221, 225) may include a data identifier (222) that identifies the data to which the entry is associated. The data identifier (222) may specify any quantity of data without departing from the invention.

Each entry (221, 225) may also include the actual QOSS over time (223) provided to the associated data. The QOSS requirements over time (213) may specify requirements for any storage that stores the associated data. For example, the QOSS requirements over time (213) may specify one or more of: (i) a minimum deduplication rate for the data, (ii) a maximum computing resource cost of storing the data, (iii) a maximum amount of time that the allowed to provide the data in response to data access requests, (iv) a maximum allowed cost for storing the data, (v) a target cost for storing the data, (vi) a minimum bandwidth/latency between a storage location of the data and a client, and (vii) a maximum summated cost of storing the data, i.e., the summed cost of storing the data in each storage in which it was stored up to a point in time. The QOSS requirements over time (213) may specify additional, fewer, or different requirements for the quality of storage service for the data without departing from the invention.

In one or more embodiments of the invention, the QOSS requirements over time (213) maybe specified for different periods of time in the future. For example, the QOSS requirements over time (213) for the associated data may include a number of QOSS requirements over different time periods (213A, 213N). In other words, the required quality of storage service for the data may change over time. For example, during a first year of the storage life of data, the QOSS requirement may specify a small amount of time for retrieving the data while in the second and later years of the storage life of the data the QOSS requirements may specify a large amount of time for retrieving the data.

In one or more embodiments of the invention, the QOSS requirements over time (213) are generated by the clients when the clients store the data. For example, a client may have a storage plan for the data at the time of storage of the data and may notify the storage gateway of the requirements at the time of storage.

While not illustrated in FIG. 2C, an identity of the storage in which the data was stored during each period of time for the duration of the storage life of the data may also be recorded in each corresponding entry of the stored data history map.

While the data structures illustrated in FIGS. 2A-2C are shown as lists of entries, the data structures may be stored in other formats, may be divided into multiple data structures, and/or portion of the data structures may be distributed across multiple computing devices without departing from the invention.

Figure 3:
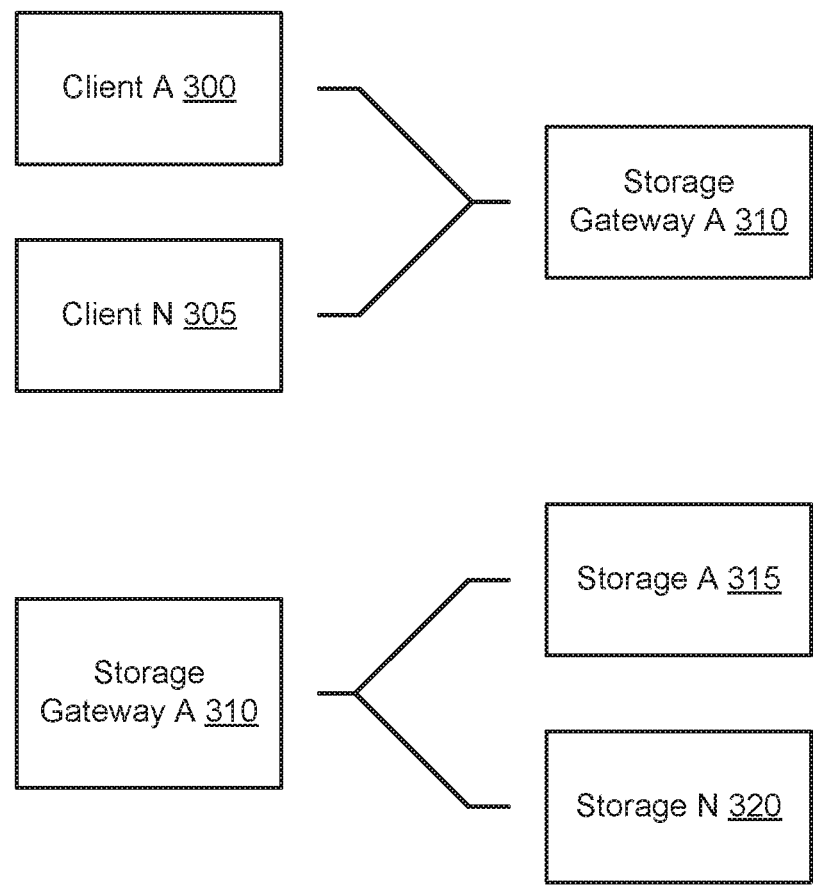
FIG. 3 shows a diagram of system relationships in accordance with one or more embodiments of the invention.

To further clarify relationships between components of the system of FIG. 1A, FIG. 3 shows a relationship diagram. As seen from the diagram, any number of clients (300, 305) may be served by a storage gateway (310), e.g., a N to one relationship. Similarly, a storage gateway (310) may utilize any number of storages (315, 320), e.g., a one to N relationship.

Figure 4A:
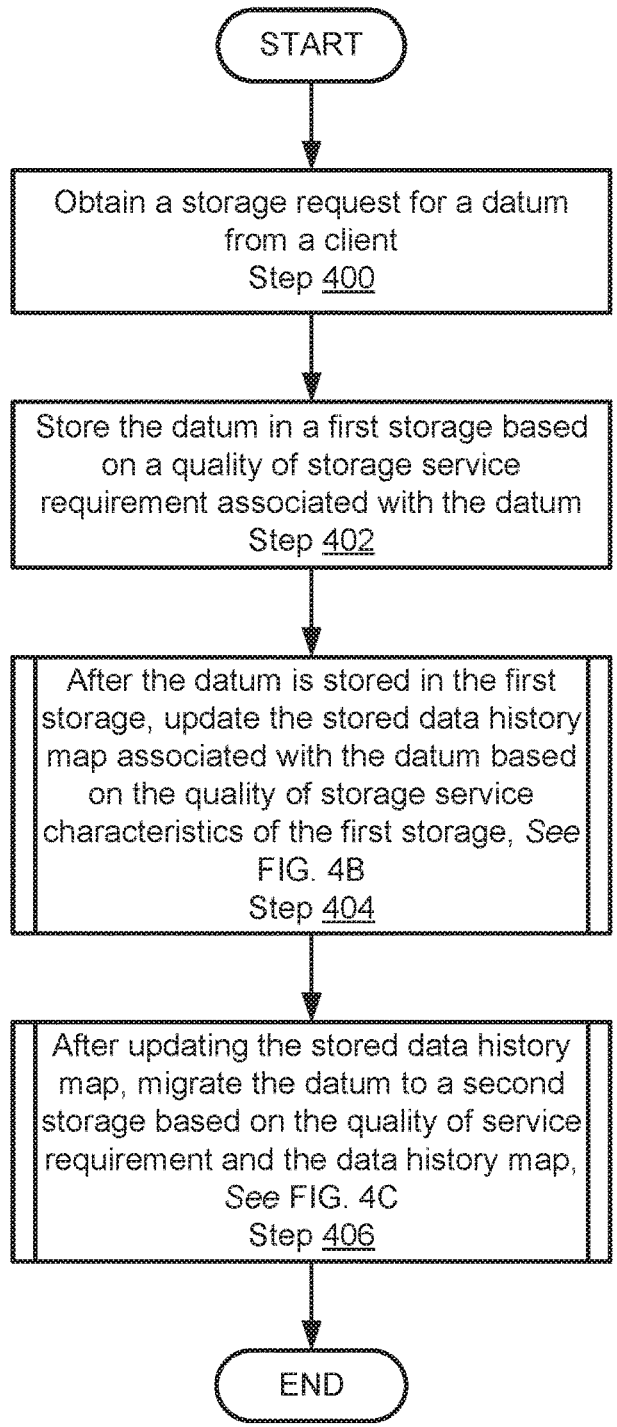
FIG. 4A shows a flowchart of a method of operating a storage gateway in accordance with one or more embodiments of the invention.
Figure 4B:
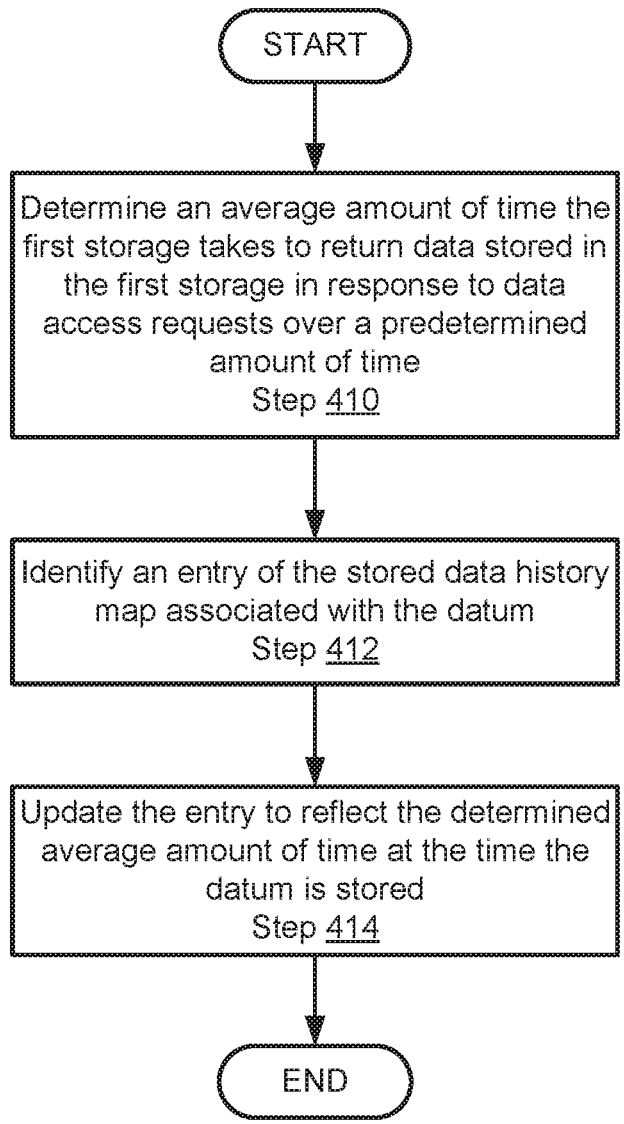
FIG. 4B shows a flowchart of a method of updating a stored data history map in accordance with one or more embodiments of the invention.
Figure 4C:
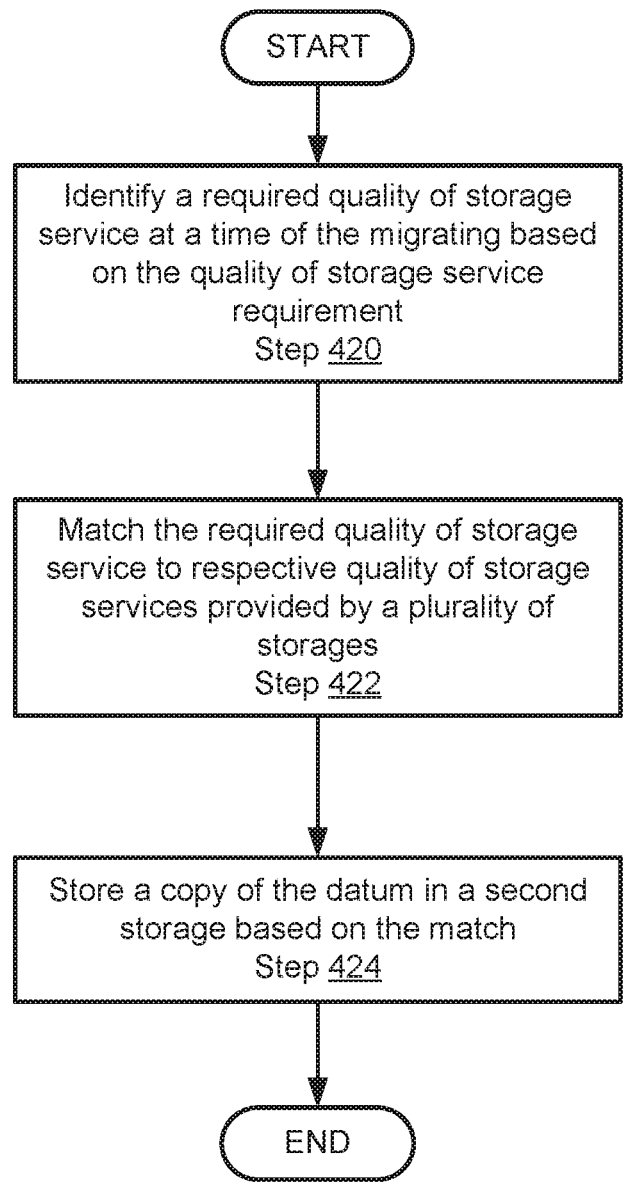
FIG. 4C shows a flowchart of a method of migrating a datum in accordance with one or more embodiments of the invention.

As discussed above, the storage gateway (110, FIG. 1A) may manage client data. FIGS. 4A-4C show methods in accordance with one or more embodiments of the invention that may be used manage client data.

While illustrated as separate methods, each of the methods illustrated in FIGS. 4A-4C may be performed sequentially or in parallel (or a combination of both serial and parallel execution) without departing from the invention. Further, one of ordinary skill will appreciate that some or all of these steps may be executed in different orders, may be combined or omitted, and some or all of the steps may be executed in parallel.

FIG. 4A shows a flowchart of a method in accordance with one or more embodiments of the invention. The method depicted in FIG. 4A may be used to manage client data in accordance with one or more embodiments of the invention. The method shown in FIG. 4A may be performed by, for example, a storage gateway (110, FIG. 1A). Other component of the system illustrated in FIG. 1A may perform the method of FIG. 4A without departing from the invention.

In Step 400, a storage request for a datum is obtained from a client. As used herein, a storage request refers to a request for storing data. The storage request may specify data from the client to be stored in a storage. The datum may be a portion of the data.

The storage request may also specify a quality of storage service requirement for the datum. The specified quality of storage service requirement may include any, or any combination, of the requirements described with respect to FIG. 2B. For example, the storage request may specify that the datum must be provided within 20 seconds during the first year of storage life of the datum and must be provided within 120 seconds during the second year of storage life of the datum. In another example, the storage request may specify that the cost of storing the datum for the first year must be less than $0.05 for the first year of storage life of the datum and must be less than $0.01 for the second year of storage life of the datum.

In Step 402, the datum is stored in a first storage based on the quality of storage service requirement associated with the datum obtained in Step 404.

In one or more embodiments of the invention, the datum is stored by selecting the first storage based on matching the required quality of storage service requirements associated with the datum to the service of storage quality provided by the first storage.

In one or more embodiments of the invention, the match is performed by comparing each of the requirements of the service of storage quality requirements and selecting the storage that meets all of the requirements. In other words, each requirement must be explicitly met.

In one or more embodiments of the invention, the match is performed by forming an objective function based on the requirements of the quality of storage service requirements and selecting the storage that minimizes the value of the objective function. In other words, not all of the quality of storage service requirements must be explicitly met but that on average the quality of storage service provided by the first storage most closely matches of the requirements. Thus, a matched storage may have some characteristics that are of a lesser quality than that specified by each requirement of the quality of storage service requirements and some characteristics that are of a higher quality than that specified by each requirement of the quality of storage service requirements. The resulting balance may best minimize the objective function.

In one or more embodiments of the invention, one or more quality of storage service metrics may be extracted from quality of storage service requirements. Each extracted metric may be a single characteristic of the quality of storage service required for the data. In other words, a subset including only a portion of the characteristics of storage service required by the quality of storage service requirements for data may be extracted. The subset including one or more metrics may be used, rather than all of the metrics of any given required quality of storage service for a data, to identify a storage in which to store data. For example, a quality of storage service requirements may include eight metrics, a single metric that specifies the time required to obtain the data from the storage may be extracted, and a storage may be selected based on the extracted metric.

In Step 404, a stored data history map associated with the datum is updated based on the quality of storage service characteristics of the first storage after the datum is stored in the first storage.

In one or more embodiments of the invention, the stored data history map is updated by modifying an entry, associated with the datum, that specifies quality of storage service characteristics of the first storage. The quality of storage service characteristics may include any of the characteristics described with respect to FIGS. 2A-2C.

In one or more embodiments of the invention, the stored data history map may be updated via the method illustrated in FIG. 4B. The stored data history map may be updated via other methods without departing from the invention.

In Step 406, the datum is migrated to a second storage based on the quality of storage service requirements associated with the datum and the data history map after the stored data history map is updated.

In one or more embodiments of the invention, migration of the datum is triggered by the quality of storage service requirements associated with the datum. For example, the quality of storage service requirements may specify different periods of time and the migration may be triggered by an end or beginning by one of the specified different periods of time.

In one or more embodiments of the invention, the migration may be performed via the method illustrated in FIG. 4C. The migration may be updated via other methods without departing from the invention.

The method may end following Step 406.

FIG. 4B shows a flowchart of a method in accordance with one or more embodiments of the invention. The method depicted in FIG. 4B may be used to update a stored data history map in accordance with one or more embodiments of the invention. The method shown in FIG. 4B may be performed by, for example, a storage gateway (110, FIG. 1A). Other component of the system illustrated in FIG. 1A may perform the method of FIG. 4B without departing from the invention.

In Step 410, an average amount of time the first storage takes to return data stored in the first storage in response to data access requests over a predetermined amount of time is determined.

In one or more embodiments of the invention, the predetermined period of time is 24 hours. In one or more embodiments of the invention, the predetermined period of time is 60 seconds.

In Step 412, an entry of the stored data history map associated with the datum is identified.

In one or more embodiments of the invention, the entry is identified by matching an identifier of the datum is matched to an identifier stored in the entry. For example, as described with respect to FIG. 2C each entry may be associated with data and includes an identifier of the associated data.

In Step 414, the identified entry is updated to reflect the determined average amount of time it takes to return the data at the time the datum is stored.

For example, as described with respect to FIG. 2C, the entry may include the actual QOSS provided to the associated data in different time periods. The entry may be updated to specify the determined average amount of time it takes to return the data at the time the datum is stored and thereby update the stored data history map.

The method may end following Step 414.

While in Step 410 of FIG. 4B, the average amount of time the first storage takes to return data stored in the first storage is determined, other quality of storage service characteristics, or a combination thereof, may be determined. In Step 414 the entry may be updated to reflect the combination of storage quality of storage service characteristics.

FIG. 4C shows a flowchart of a method in accordance with one or more embodiments of the invention. The method depicted in FIG. 4C may be used to migrate data in accordance with one or more embodiments of the invention. The method shown in FIG. 4C may be performed by, for example, a storage gateway (110, FIG. 1A). Other component of the system illustrated in FIG. 1A may perform the method of FIG. 4C without departing from the invention.

In Step 420, a required quality of storage service at a time of the migrating is identified based on the quality of storage service requirements associated with the datum.

In one or more embodiments of the invention, the required quality of storage service is identified using an entry of a stored data quality of storage service data structure as illustrated in FIG. 2B. More specifically, an entry of the data structure is identified that has an identifier that matches an identifier of the datum. The matched entry may include the required quality of storage service at the time of migration.

In Step 422, the required quality of storage service is matched to respective quality of storage services provided by a plurality of storages. The plurality of storage may be operably connected to a storage gateway performing the migration at the time of the migration. In one or more embodiments of the invention, the match results in the selection of one of storage of the plurality of storages.

In one or more embodiments of the invention, the match is performed by comparing each of the requirements of the quality of storage service requirements and selecting the storage that meets all of the requirements. In other words, each requirement must be explicitly met for the corresponding storage to be matched.

In one or more embodiments of the invention, the match is performed by forming an objective function based on the requirements of the quality of storage service requirements and selecting the storage that minimizes the value of the objective function. In other words, not all of the quality of storage service requirements must be explicitly met but that on average the quality of storage service provided by the first storage most closely matches of the requirements. Thus, a matched storage may have some characteristics that are of a lesser quality than that specified by each requirement of the quality of storage service requirements and some characteristics that are of a higher quality than that specified by each requirement of the quality of storage service requirements. The resulting balance may best minimize the objective function.

In Step 424, a copy of the datum is stored in a second storage based on the match of Step 422. In one or more embodiments of the invention, the second storage is the matched storage of Step 422.

The method may end following Step 424.

While the methods illustrated in FIGS. 4A-4C have been described with respect to migration of data, the methods illustrated may also be used for replication or other data integrity operations performed by a storage gateway without departing from the invention. Specifically, the methods described may enable a storage to be selected for the performance of the data integrity operations.

Figure 5A:
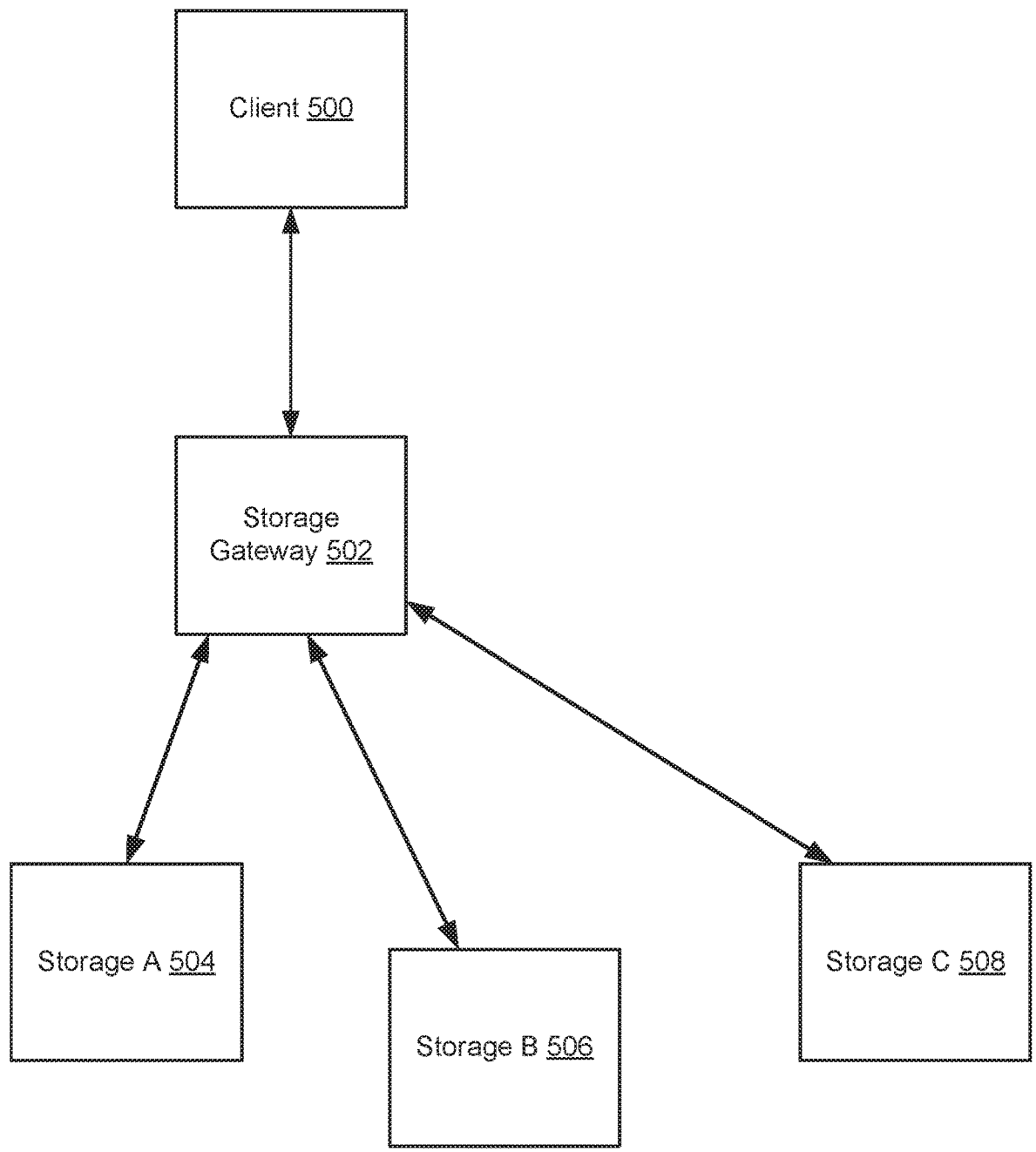
FIG. 5A shows a diagram of an example system at a first point in time.
Figure 5B:
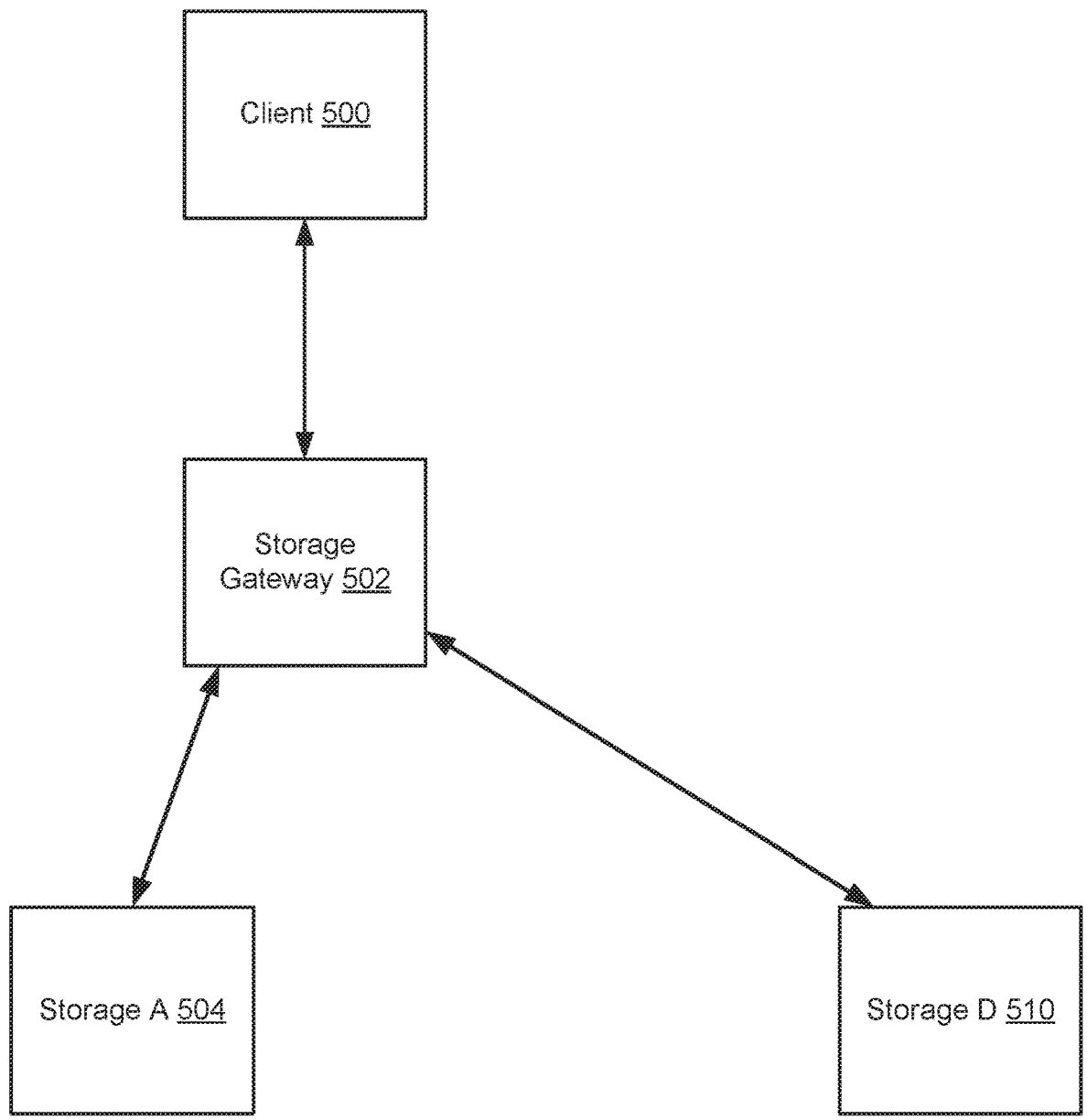
FIG. 5B shows a diagram of the example system of FIG. 5A at a second point in time.
Figure 5C:
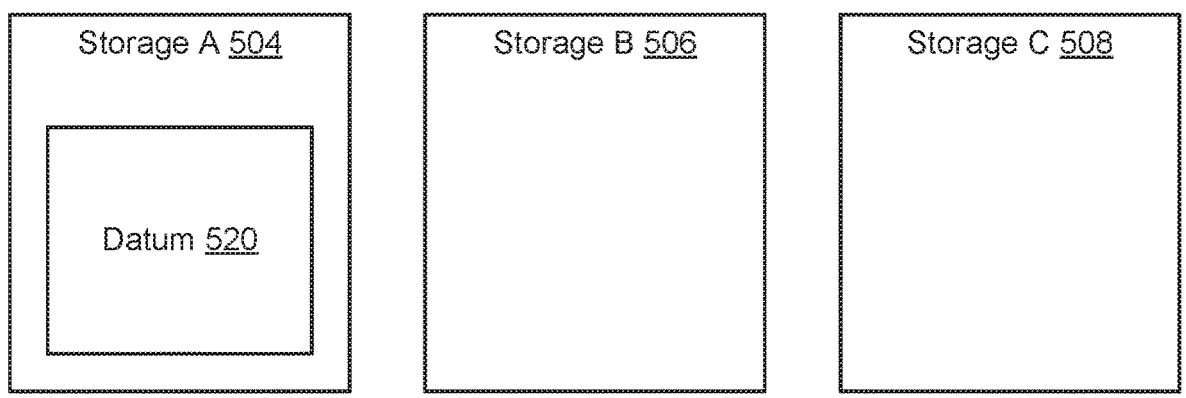
FIG. 5C shows a diagram of data stored in the example system of FIG. 5A at the first point in time.

To further explain embodiments of the invention, a non-limiting example is shown in FIGS. 5A-5C.

Example 1

FIG. 6A shows a diagram of a topology of an example system. The system includes a client (500) operably connection to three storages (504, 506, 508) via a storage gateway (502). The three storages (504, 506, 508) are operably connected to the storage gateway (502) via operable connections.

Each of the storages provides different qualities of storage service. Storage A (504) provides the lowest data access time. Storage B (506) provides a mid-level data access time. Storage C (508) provides a high data access time.

At a first point in time, the client (500) requests that a datum be stored. The client sends the request to the storage gateway (502). The client additionally specifies a quality of storage service requirement for the data that requires a low data access time, i.e., a short time between a data access request is sent and when the requested data is received, during the first year of storage life of the datum and a high data access time during a second year of storage life of the datum. In response to the request, the storage gateway (502) may stores the data fragment in storage A (504) because the required quality of storage service of the datum is only met by Storage A (504) at the time the data is being stored, i.e., the first year of the storage life of the datum.

FIG. 5C shows a diagram illustrating the data stored in the various storages of the system illustrated in FIG. 5A at the first point in time. As illustrated, the datum (520) is stored in storage A (504). Additionally, while not shown, the stored data history map includes an entry that reflects the quality of storage service provided to the datum by Storage A (504) to document the quality of storage service provided to the datum.

Six months after the datum is stored, storages B and C (506, 508) are removed from the system as illustrated in FIG. 5B. Additionally, a new storage D (510) is added to the system. Storage D (510) provides a high data access time, in contrast to the low data access time provided by storage A (504).

After an additional six month (one year since the datum was stored), the quality of storage service requirements indicate that the required access time for the data increases from a low access time to a high access time. Based on the change, a migration of the stored datum is triggered. At the time the migration is triggered, the storage gateway (502) performs a portion of the methods illustrated in FIGS. 5A-5C to select a storage for migrating the datum. Since the quality of storage service requirements for the period following one year of storage require a high data access time, storage D (510) is selected for migration.

Figure 5D:
FIG. 5D shows a diagram of data stored in the example system of FIG. 5B after the second point in time.

FIG. 5D shows a diagram illustrating the data stored in the various storages of the system illustrated in FIG. 5B after the datum (520, FIG. 5C) is migrated to storage D (510). The datum (520, FIG. 5C) is migrated by storing a copy of the datum in storage D (510) and deleting the originally-stored datum from storage A (504).

Example 1 ends here.

Figure 6:
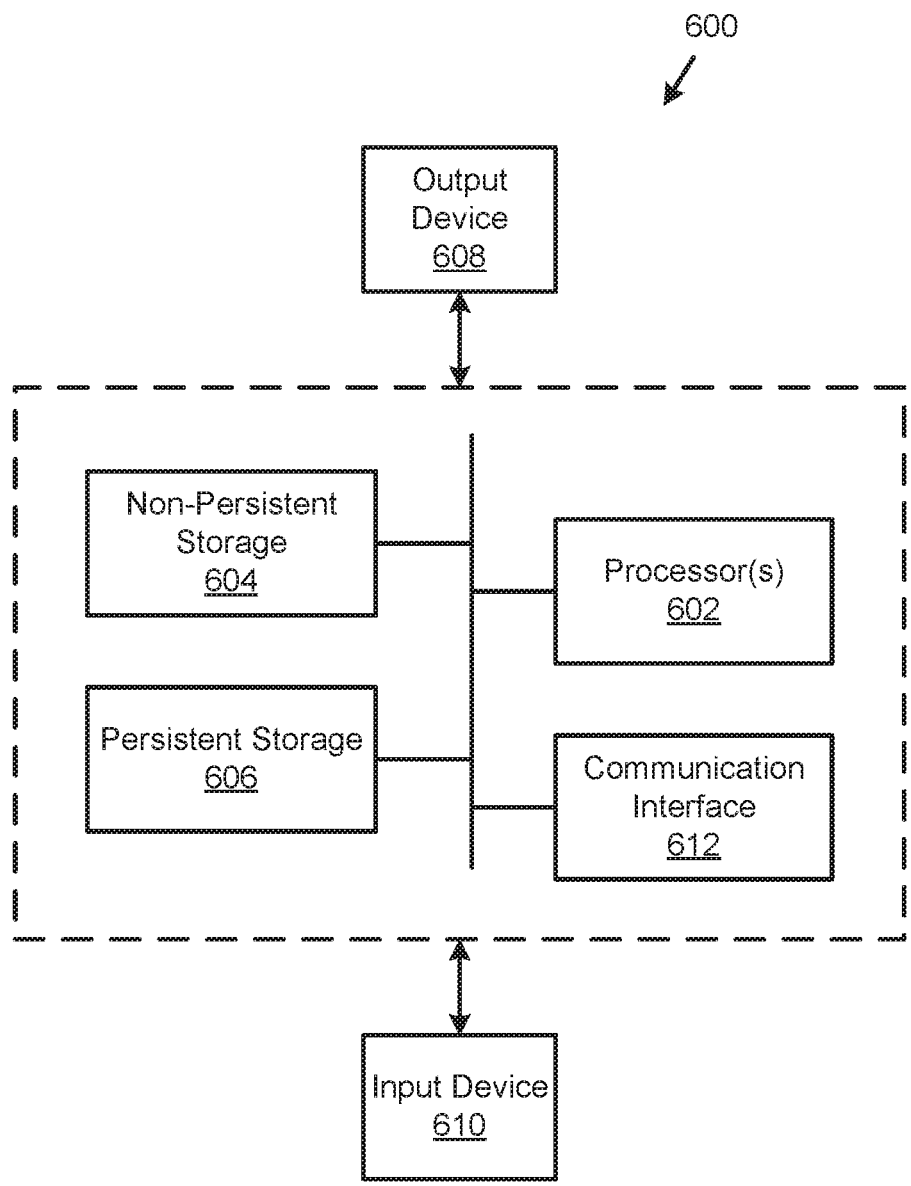
FIG. 6 shows a diagram of a computing device in accordance with one or more embodiments of the invention.

As discussed above, embodiments of the invention may be implemented using a computing device. The system of FIG. 1A may utilize any number of computing devices to provide the functionality described throughout this application. For example, a storage gateway, storage, or other elements of the system may be implemented using computing devices. FIG. 6 shows a diagram of a computing device in accordance with one or more embodiments of the invention. The computing device (600) may include one or more computer processor(s) (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may address the problem of managing data in a networked environment having a topology that changes over the life of the data. For example, the topology of a network that store data from clients may change over time due to the addition or removal of storages. Unlike traditional computing devices (e.g., desktop computers) that generally have a fixed amount of unshared storage, a network that stores data may change dynamically. Additionally, the connections between components of the network may also change, e.g., the bandwidth or latency of each connection may change over time. To manage the storage of data in a networked environment, embodiments of the invention provide a method of dynamically identifying a storage in which to store the data using a stored data history map. The stored data history map may enable the system to dynamically select an appropriate storage for the data to meet quality of storage service requirements of the data.

The aforementioned problem of managing data in a networked environment is uniquely encountered due to the technological environment in which networked storage operates. Due to the rise of geographically distributed storages, client data is frequently store data in storages that vary in location and the quality of storage service provided by the storages varies. Unlike traditional internal storages of desktop computers, the quality of storage service provided by storages in a network environment depends on numerous characteristics of the storage including the type of data stored in the storages, the deduplication used by the storages to store the data, the topology of the network, and the computing resources of the storages. Embodiments of the invention may proactively identify an appropriate storage at the time of storing data to ensure quality of storage service requirements for the data are met. Thus, embodiments of the invention improve the operation of the storage of data in a networked environment by ensuring that quality of storage service requirements for the stored data are met. In contrast, static storage arrangements are unable to ensure that quality of storage service requirements are met.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may enable one or more of the following: i) improve a quality of storage service provided to clients by taking into account the storage history of data in a networked environment, ii) reduce the cost of storing data in a network environment by minimizing the cost of storing the data to storages that provide only the required quality of storage service for client data, and iii) reduce a cognitive burden on a user by automatically monitoring the topology of a network and selecting the storage location for data from a client controlled by the user.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A storage gateway for managing data, comprising:
a persistent storage comprising a stored data history map;
a processor programmed to:
  obtain a data storage request for a datum from a client;
  store the datum in a first storage based on a quality of storage service requirement associated with the datum;
  after the datum is stored in the first storage, update the stored data history map associated with the datum based on the quality of storage service characteristics of the first storage, wherein the stored data history map specifies:
    storage locations of where the datum is stored over time, and
    an actual quality of storage service provided by the storage locations; and
  after updating the stored data history map, migrate the datum to a second storage based on the quality of storage service requirement and the updated stored data history map.

2. The storage gateway of claim 1, wherein the second storage is not available to store the datum when the datum is stored in the first storage.

3. The storage gateway of claim 1, wherein the quality of storage service requirement specifies a maximum amount of time the storage gateway is allowed to provide the datum in response to a client request.

4. The storage gateway of claim 1, wherein the quality of storage service requirement specifies a plurality of predetermined periods of time, wherein each predetermined period of time of the plurality of predetermined periods of time is associated with a respective quality of storage service during the predetermined period of time.

5. The storage gateway of claim 4, wherein each respective quality of storage service specifies a maximum amount of time the storage gateway is allowed to provide the datum in response to a client request during an associated predetermined period of time.

6. The storage gateway of claim 5, wherein a first respective quality of storage service and a second respective quality of storage service specify different maximum amounts of time.

7. The storage gateway of claim 1, wherein migrating the datum to the second storage based on the quality of storage service requirement and the updated stored data history map comprises:
  identifying a required quality of storage service at a time of the migrating based on the quality of storage service requirement;
  matching the required quality of storage service to respective quality of storage services provided by a plurality of storages, wherein each storage of the plurality of storages are operably connected to the storage gateway at the time of migrating; and
  making a copy of the datum in the second storage, wherein the second storage is a storage of the plurality of storages.

8. The storage gateway of claim 7, wherein identifying the required quality of storage service at the time of the migrating based on the quality of storage service requirement comprises:
  identifying a storage life of the datum based on the updated stored data history map;
  matching the identified storage life to an entry of the quality of storage service requirements; and
  using the required quality of storage service specified by the entry as the identified required quality of storage service,
  wherein the second storage is a storage of the plurality of storages.

9. The storage gateway of claim 7, wherein matching the required quality of storage service to respective quality of storage services provided by a plurality of storages comprises:
  extracting a quality of storage service metric from the required quality of storage service;
  comparing the extracted quality of storage service metric to respective quality of storage services provided by all storages operably connected to the storage gateway at the time of migrating; and
  identifying the matched plurality of storages based on the comparing.

10. The storage gateway of claim 9, wherein matching the required quality of storage service to respective quality of storage services provided by a plurality of storages further comprises:
  extracting a second quality of storage service metric from the required quality of storage service;
  comparing the second extracted quality of storage service metric to respective quality of storage services provided by the matched plurality of storages; and
  reducing a cardinality of the matched plurality of storages based on the comparing.

11. The storage gateway of claim 1, wherein updating the stored data history map associated with the datum based on the quality of storage service characteristics of the first storage comprises:
  determining an average amount of time the first storage takes to return data stored in the first storage in response to data access requests at the time the datum is stored in the first storage;
  identifying an entry of the quality of storage service characteristics associated with the first storage; and
  updating the entry to reflect the determined average amount of time at the time the datum is stored.

12. The storage gateway of claim 1, wherein updating the stored data history map associated with the datum based on the quality of storage service characteristics of the first storage comprises:
  determining an average amount of time the first storage takes to return data stored in the first storage in response to data access requests over a predetermined amount of time;
  identifying an entry of the quality of storage service characteristics associated with the first storage; and
  updating the entry to reflect the determined average amount of time at the time the datum is stored.

13. The storage gateway of claim 12, wherein the predetermined amount of time comprises a period of time preceding the time the datum is stored in the first storage.

14. The storage gateway of claim 1, wherein the updated stored data history map specifies an amount of time the datum was stored in a cache of the storage gateway before being stored in the first storage.

15. A method of operating a storage gateway for managing data, comprising:
- obtaining a data storage request for a datum from a client;
- storing the datum in a first storage based on a quality of storage service requirement associated with the data;
- after storing the datum, updating a stored data history map associated with the datum based on the quality of storage service characteristics of the first storage, wherein the stored data history map specifies:
  - storage locations of where the datum is stored over time, and
  - an actual quality of storage service provided by the storage locations; and
- after updating the stored data history map, migrating the datum to a second storage based on the quality of storage service requirement and the updated stored data history map.

16. The method of claim 15, wherein migrating the datum to the second storage based on the quality of storage service requirement and the updated stored data history map comprises:
- identifying a required quality of storage service at a time of the migrating based on the quality of storage service requirement;
- matching the required quality of storage service to respective quality of storage services provided by a plurality of storages, wherein each storage of the plurality of storages are operably connected to the storage gateway at the time of migrating; and
- making a copy of the datum in the second storage,
- wherein the second storage is a storage of the plurality of storages.

17. A non-transitory computer readable medium comprising computer readable program code, which when executed by a computer processor enables the computer processor to perform a method for operating a storage gateway for managing data, the method comprising:
- obtaining a data storage request for a datum from a client;
- storing the datum in a first storage based on a quality of storage service requirement associated with the data;
- after storing the datum, updating a stored data history map associated with the datum based on the quality of storage service characteristics of the first storage, wherein the stored data history map specifies:
  - storage locations of where the datum is stored over time, and
  - an actual quality of storage service provided by the storage locations; and
- after updating the stored data history map, migrating the datum to a second storage based on the quality of storage service requirement and the updated stored data history map.

18. The non-transitory computer readable medium of claim 17, wherein migrating the datum to the second storage based on the quality of storage service requirement and the updated stored data history map comprises:
- identifying a required quality of storage service at a time of the migrating based on the quality of storage service requirement;
- matching the required quality of storage service to respective quality of storage services provided by a plurality of storages, wherein each storage of the plurality of storages are operably connected to the storage gateway at the time of migrating; and
- making a copy of the datum in the second storage,
- wherein the second storage is a storage of the plurality of storages.

* * * * *